United States Patent Office 3,412,040
Patented Nov. 19, 1968

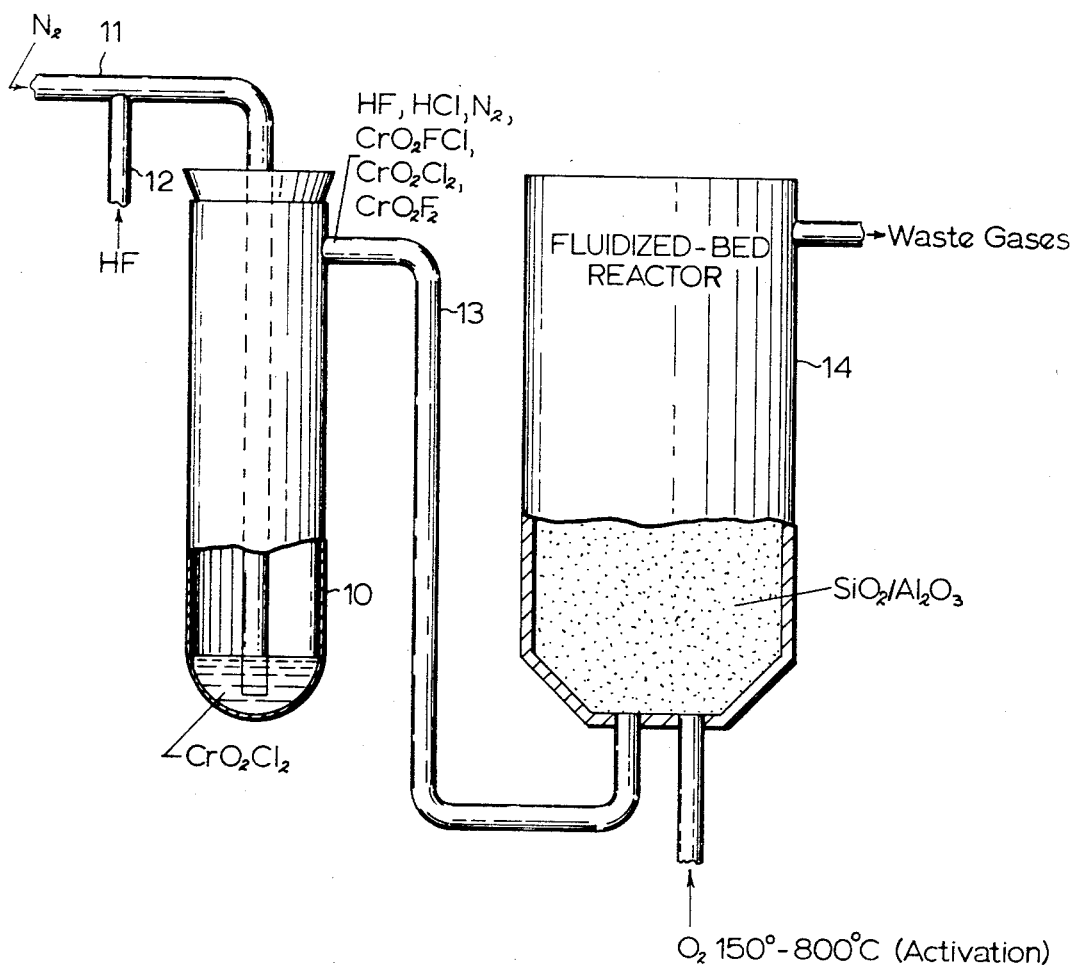

3,412,040
CHROMYL-OXYHALIDE TREATED CARRIER AS AN OLEFIN POLYMERIZATION CATALYST
Pietro Saccardo, Gianni Trada, Vittorio Fattore, and Jean Herzenberg, Milan, Italy, assignors to Montecatini Edison, S.p.A., Milan, Italy, a corporation of Italy
Filed Aug. 5, 1964, Ser. No. 387,732
Claims priority, application Italy, Aug. 9, 1963, 16,875/63
2 Claims. (Cl. 252—441)

ABSTRACT OF THE DISCLOSURE

A single-component catalyst for the polymerization of alpha-olefins, consisting essentially of a silica-containing catalyst carrier reacted with chromyl chloride ($CrO_2Cl_2$) and/or chromyl fluorochloride ($CrO_2FCl$), alone or in the presence of chromyl fluoride ($CrO_2F_2$), and thereafter activated for subsequent direct use in the polymerization process by heating the single-component catalyst in oxygen or inert gas to a temperature of 300° to 600° C.

Our present invention relates to improved catalytic systems and a method of producing such systems.

More particularly, this invention is concerned with catalyst systems containing chromium (e.g. as chromium oxides) deposited upon a catalyst carrier or support.

Chromium-containing catalyst systems are commonly used in the polymerization of various monomers and, especially, olefinic monomers. Thus, catalyst compositions of this general type can be used in the polymerization of alpha-olefins (e.g. ethylene) in the production of corresponding polyolefins.

In most cases, the catalyst system comprises a carrier consisting predominantly of a silicon oxide (e.g. silica) and/or alumina. The chromium oxide most suitable for producing polyolefins and for depositing on carrier of this type is chromium trioxide. In earlier techniques for the production of catalyst systems, the carrier was usually impregnated with a solution of chromium trioxide or a chromium salt which, upon heating, yields chromium trioxide, chromium sesquioxide or mixtures thereof. The catalyst system obtained in this manner can then be activated by heating to relatively high temperatures in the presence of oxygen or oxygen-containing gases (e.g. air).

In our copending application Serial No. 379,608, filed July 1, 1964, and entitled: "Process for producing catalyst compositions and the product of this process," however, we describe and claim an improved method of producing catalyst systems of the general class referred to above. In this improved technique, a chromium oxide can be deposited upon a siliceous carrier by reacting the carrier with a fluorine-containing compound of chromium, preferably a chromium oxyfluoride, to yield volatile silicon fluoride and chromium oxides which are thus deposited on the surface of the silicon containing carrier. While this system has application to other chromium compounds containing fluorine, it is desirable to make use of chromyl fluoride ($CrO_2F_2$) thereby ensuring that the deposited compound is an oxide. The preparation of the catalyst system in this manner, by displacement of atoms of silicon from the carrier, renews the effective surface of the catalyst so that the chromium oxide is deposited at the newly formed faces which give rise to particularly effective active centers. There is evidence that the method results in the formation of a uniform layer of substantially constant thickness on the carrier, presumably because the initial molecular layer acts as a barrier to further reaction of the fluorinated compound with silicon. Thus the reaction terminates locally after formation of the oxide which appears to be present as a molecular layer.

It is the principal object of the present invention to provide an improved method of producing chromium-containing catalytic systems suitable for use in the polymerization of olefins and for similar purposes.

Still another object of this invention is to provide a catalyst system having particular effectiveness in promoting polymerization reactions as described above.

These objects and others which will become apparent hereinafter are attained, in accordance with the method of the present invention, by treating a catalyst carrier with a chromium oxychloride and, more specifically, with a chromyl halide containing chlorine. The catalyst carrier, thus coated with the chromium compound, is then subjected to activation by heating in the presence of a fluid such as pure orygen, oxygen-containing gases or inert gases. It has been found that catalyst systems produced in this manner, i.e. by impregnating the catalyst carrier with a chromyl chloride and activating the resulting mass, are particularly active and effective in the polymerization of alpha-olefins to the corresponding polyolefins. The catalyst carrier can, according to the present invention, be any of those considered heretofore to be suitable carriers for chromium compounds. Suitable carriers, for the purposes of the present invention, are silica, alumina, kieselguhr, pumice, aluminum phosphate and titanium dioxide as well as mixtures thereof. When the polymerization of alpha-olefins is desired, silica, alumina or silica-aluminas are most suitable.

According to another feature of this invention, the treatment with chromyl chloride is effected in the liquid phase whereby the liquid chromyl chloride contacts the catalyst carrier directly. In a modification of the liquid-phase technique, the chromyl chloride can be dissolved in a solvent (e.g. 1,2-dibromoethane nitrobenzene, chloroform and carbon tetrachloride). In another advantageous method of treating the catalyst carrier with chromyl chloride, the latter is constituted as part of a gas stream which is employed to contact the carrier. In this case, it is desirable to convey the chromyl chloride to the carrier in a gas stream containing an inert gas (e.g. nitrogen), i.e. a gas incapable of reacting with the chromyl compound. According to another feature of this invention, the chromyl chloride ($CrO_2Cl_2$) is reacted with hydrogen flouride to produce chromyl fluoride, which reacts with a siliceous-catalyst carrier as described in our copending application referred to above. The reaction also yields chromyl fluorochloride which is capable of reacting with silica to yield silicon tetrafluoride and deposits a chromyl-containing compound upon the surface of a carrier.

It has been discovered that the technique of the present invention is surprisingly effective in depositing relatively large quantities of chromium on thet carrier. Catalyst systems of this type, however, are most effective when the chromium content is between substantially 0.1 and 10% by weight of the catalyst system and preferably between 0.1 and 4% by weight when the catalyst is employed in the polymerization of alpha-olefins. Activation of the catalyst system is effected, according to this invention, by heating it to temperatures ranging between substantially 150° and 800° C. in the presence of oxygen, an oxygen-containing gas or an inert gas (e.g. nitrogen). Activation temperatures between 300° and 600° C. are most desirable when the catalyst system is to be employed for the production of alpha-olefins. It should be further noted that catalyst systems prepared in accordance with the principles of our invention, using chromyl chlorides and chromyl fluorides, in conjunction with or without activation have been found to evidence synergistic activity giving rise to catalyst efficiencies in excess of those obtained when the chromyl fluoride and the chromyl chloride are used alone. Still higher efficiencies result when activation is employed.

The invention will become more readily apparent from the following description, reference being made to the accompanying drawing, the sole figure of which is a diagrammatic view of an apparatus for producing a catalyst system according to this invention, and the specific examples given hereunder as the best mode known to the inventors for taking advantage of the present discovery.

Example I 0.9 grams of chromyl chloride ($CrO_2Cl_2$) were introduced into a reactor provided with a bubbling pipe and an outlet pipe at the top of the reactor. The bubbling pipe was connected with a nitrogen source, whereas the outlet pipe was connected with a second reactor, which was constructed so as to oeprate according to the fluidized-bed technique; the latter reactor contained 10 grams of silica-alumina (87% by weight silica and 13% by weight alumina). By bubbling nitrogen through the chromyl chloride in the first vessel, vapors of this component were conveyed to the silica-alumina of the second vessel which was maintained at 150° C. After all of the chromyl chloride was deposited on the silica-alumina, further quantities of nitrogen were passed through the system to act as the inert gas providing the activation atmosphere, while the temperature of the silica-alumina was raised up to 520° C. at which it was held for 2 hours. After cooling, the catalytic system thus obtained was utilized with good results for polymerizing ethylene to a solid product.

Example II 1.8 grams of chromyl chloride ($CrO_2Cl_2$) and 20 grams of silica-alumina (cf. Example I) were placed in an apparatus analogous to that described in Example I. Chromyl chloride was deposited on the silica-alumina catalyst carrier as set forth in Example I, except that oxygen was employed instead of nitrogen as the conveying gas. When all chromyl chloride was deposited on the silica-alumina, oxygen through-put was maintained for an additional 20 hours after which the catalytic system was activated for 2 hours at 510° C. in a stream of dry air. After cooling, the catalytic system thus produced was efficaciously employed in polymerizing ethylene to a solid polymer.

Example III

A catalytic system was prepared as follows: 5 grams of chromyl chloride were placed in a glass vessel provided with a bubbling pipe for introduction of a gas and a gas-outlet pipe. An inert-gas stream (e.g. nitrogen, helium or argon) was passed through the bubbling pipe; the mixture of inert-gas chromyl chloride vapors was conveyed through the outlet pipe to a reactor containing silica-alumina (about 87% by weight silica). After about one hour, the through-flow of the gaseous mixture to the silica-alumina was halted and the catalyst was activated by heating (in the presence of oxygen or the inert gas) for 2 hours at about 500° C. A portion of the resulting catalytic system was successfully employed for polymerizing ethylene to a solid polymer.

Example IV 0.9 grams of chromyl chloride were introduced into a glass vessel provided with a bubbling pipe and an outlet pipe, which was connected with a second reactor operating according to the fluidized bed technique and containing 15 grams of silica (Ketjen) previously dried for 1 hour at 350° C. By means of a dry air stream passed through the bubbling pipe, the vapors of chromyl chloride were conveyed into the silica-containing reactor. After all of the chromyl chloride was transferred, the temperature of the silica-containing reactor was raised to 300° C. and maintained at this level for 2 hours while the dry air stream, as the activating atmosphere, continued to pass through the second reactor. After this treatment a catalytic mass, active in the polymerization of ethylene, was obtained and found to contain 1.58% by weight chromium.

Example V 1.4 grams of chromyl chloride and 23 grams of γ-alumina (Ketjen grade A), previously dried for 3 hours at 500° C., were introduced into an apparatus analogous to the one described in Example IV. The chromyl chloride was deposited on the alumina as set forth in this Example. After heating at 300° C. for about half an hour, in stream of dry air, an activated catalytic mass was obtained containing 2.14% by weight of chromium.

Example VI

In'o a 0.5 liter glass flask equipped with stirrer and reflux condenser were introduced 120 ml. of carbon tetrachloride and 4.5 grams of chromyl chloride. With stirring 50 grams of silica-alumina (Davison, 87% by weight silica and 13% by weight alumina) previously dried for 3 hours at 400° C. were introduced.

After stirring of the suspension thus produced for 90 minutes at about 70° C. the carbon tetrachloride was removed by distillation. The silica-alumina, removed from the flask, was heated at 300° C. for 1 hour in stream of dry air in a reactor operating with the fluidized bed technique. After this treatment, a catalytic mass, suitable for the production of polyolefins, was obtained containing 2.46% by weight chromium.

Example VII 2 grams of chromyl chloride were placed in a Monel bubbler 10 (see the accompanying drawing) through which a gaseous mixture was passed containing 90% nitrogen and 10% hydrogen fluoride, with a throughput of 500 ml./minute via inlet tubes 11 and 12.

The gaseous mixture emerging from tube 13 of the bubbler 10 and consisting of chromyl chloride, chromyl fluoride, chromyl fluorochloride, hydrogen chloride, hydrogen fluoride and nitrogen was passed at room temperature through a stainless-steel reactor 14 containing 100 grams of silica-alumina (Davison, 87% by weight silica and 13% by weight alumina). When no more chromyl chloride remained in the bubbler 10, the flow of hydrogen fluoride was stopped, while the flow of nitrogen was maintained in order to purify the catalyst from occasional acid vapors physically entrapped on it. The olefin-polymerization catalyst contained of 1.37% by weight chromium.

Example VIII

Into an apparatus analogous to the one described in Example VI were introduced 1.4 grams of chromyl chloride and 21 grams of silica-alumina (Davison, 87% by weight silica and 13% by weight alumina), previously dried at 400° C. for 2 hours. By means of a stream of dry air, the chromyl chloride was conveyed to the silica-alumina and deposited thereon. Upon deposition of all of the chromyl chloride on the silica-alumina, the latter was heated at 300° C. for half an hour in a stream of dry air. The olefin-polymerization catalyst contained 2.02% by weight chromium.

What is claimed is:

1. A method of producing an alpha-olefin polymerization-catalyst system comprising the steps of incompletely reacting a chromium oxychloride of the formula $CrO_2Cl_2$ with hydrogen fluoride to produce a gas stream containing chromyl chloride, chromyl fluoride and chromyl fluorochloride; treating a silica-containing catalyst carrier with said gas stream containing chromyl chloride, chromyl fluoride and chromyl fluorochloride to deposit a chromium compound on said carrier and form a single-component catalyst; and activating said single-component catalyst by heating the carrier treated with said gas stream in the presence of a fluid selected from the group which consists of oxygen and inert gases to a temperature of substantially 300° to 600° C. to render said single-component catalyst directly effective without further reaction in said polymerization.

2. The catalyst system produced by the method of claim 1.

References Cited

UNITED STATES PATENTS

| | | | |
|---|---|---|---|
| 3,216,982 | 11/1965 | Orzechowski et al. | 252—458 |
| 3,322,691 | 5/1967 | Craven | 252—458 |
| 3,346,511 | 10/1967 | Hill | 252—455 |
| 3,166,544 | 1/1965 | Orzechowski et al. | 252—429 X |
| 2,263,623 | 11/1941 | Gertler | 23—87 |
| 2,825,721 | 3/1958 | Hogan et al. | 260—94.9 |
| 2,874,129 | 2/1959 | Bell | 252—454 |
| 2,892,000 | 6/1959 | Skiles | 252—441 |
| 2,993,883 | 7/1961 | Lyons | 252—467 |
| 3,190,840 | 6/1965 | Biais et al. | 252—465 |

OTHER REFERENCES

Oliveri-Gazz. Chim. (Italy) 16, p. 221 (1886).

Pascal (Edit.) Noveau Traite de Chim. Min., vol. XIV, p. 151 (1959).

DANIEL E. WYMAN, *Primary Examiner.*

PAUL E. KONOPKA, *Assistant Examiner.*